(12) United States Patent
Yonehara et al.

(10) Patent No.: US 11,287,893 B2
(45) Date of Patent: Mar. 29, 2022

(54) HAPTIC FEEDBACK DEVICE

(71) Applicant: TOYODA GOSEI CO., LTD., Kiyosu (JP)

(72) Inventors: Yuji Yonehara, Kiyosu (JP); Tadatoshi Kurogi, Kiyosu (JP); Takeshi Fujiwara, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/157,223

(22) Filed: Jan. 25, 2021

(65) Prior Publication Data
US 2021/0247844 A1    Aug. 12, 2021

(30) Foreign Application Priority Data

Feb. 12, 2020   (JP) .............................. JP2020-021421

(51) Int. Cl.
*G09G 5/38*         (2006.01)
*G06F 3/01*         (2006.01)

(52) U.S. Cl.
CPC .............. *G06F 3/016* (2013.01); *G06F 3/014* (2013.01)

(58) Field of Classification Search
None
See application file for complete search history.

(56) References Cited

U.S. PATENT DOCUMENTS

2017/0168575 A1*  6/2017  Kasahara ............ G06F 3/04166
2018/0263501 A1*  9/2018  Shim ...................... A61B 5/681

FOREIGN PATENT DOCUMENTS

JP          5466757 B2      4/2014
JP          2019-200699 A   11/2019

* cited by examiner

*Primary Examiner* — Carl Adams
(74) *Attorney, Agent, or Firm* — Posz Law Group, PLC

(57) ABSTRACT

A haptic feedback device includes a dielectric elastomer actuator (DEA) and a driving unit. The DEA includes at least one dielectric layer, electrode layers sandwiching the dielectric layer, and a transmitting layer that forms an outermost layer. The at least one dielectric layer includes an expansion-contraction portion, which expands and contracts when applied with a voltage, and a heat generating portion, which generates heat when applied with a voltage. The haptic feedback device is configured to transmit vibration to a user via the transmitting layer by applying an expansion-contraction voltage between the electrode layers sandwiching the expansion-contraction portion through the driving unit, and transmit heat sensation to the user via the transmitting layer by applying a heat generating voltage between the electrode layers sandwiching the heat generating portion through the driving unit.

18 Claims, 5 Drawing Sheets

HAPTIC FEEDBACK DEVICE

BACKGROUND

1. Field

The present disclosure relates to a haptic feedback device.

2. Description of Related Art

Haptic feedback devices transmit tactile sensations to users.

A typical haptic feedback device includes a sheet-shaped dielectric elastomer actuator (DEA), a pushing portion, and a holding portion. The DEA is configured to change its length in a first direction along a planar direction in accordance with an applied voltage. The pushing portion is configured to elastically push a first main surface of the DEA. The holding portion holds the DEA from opposite sides in the first direction of the section pushed by the pushing portion.

The typical device described above is worn by a user such that a center of a second main surface of the DEA is in contact with a finger. Specifically, the device includes a haptic feedback portion, which is on the opposite side from the position fixed to and pushed by the pushing portion, and the device is worn by the user such that the haptic feedback portion is in contact with the finger. When a voltage is applied to the DEA, the DEA extends in the first direction. Accordingly, on the basis of a restoring force of the pushing portion in a compressed state, the DEA is pushed toward the second main surface. That is, the DEA is deformed such that the pushing force of the pushing portion and the tensile force of the DEA are in equilibrium, so that the haptic feedback portion of the DEA bulges. The bulging haptic feedback portion of the DEA pushes the contacting part of the user, transmitting a virtual force sensation (touch sensation) to the user.

Typical haptic feedback devices are capable of transmitting pressure to users by utilizing expansion and contraction of a DEA through application of a voltage.

SUMMARY

Exemplary embodiments of the present disclosure provide a haptic feedback device that is capable of transmitting both of vibration and heat sensation to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a haptic feedback device includes a dielectric elastomer and a driving unit. The dielectric elastomer actuator includes at least one dielectric layer, electrode layers sandwiching the dielectric layer, and a transmitting layer that is stacked on at least one of the electrode layers and forms an outermost layer. The driving unit is configured to apply voltage between the electrode layers sandwiching the dielectric layer. The at least one dielectric layer includes an expansion-contraction portion, which expands and contracts when applied with a voltage, and a heat generating portion, which generates heat when applied with a voltage. The haptic feedback device is configured to: transmit vibration to a user via the transmitting layer by applying an expansion-contraction voltage between the electrode layers sandwiching the expansion-contraction portion through the driving unit; and transmit heat sensation to the user via the transmitting layer by applying a heat generating voltage between the electrode layers sandwiching the heat generating portion through the driving unit.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Haptic feedback devices 10 according to a first embodiment will now be described with reference to FIGS. 1 to 4.

Figure 1:
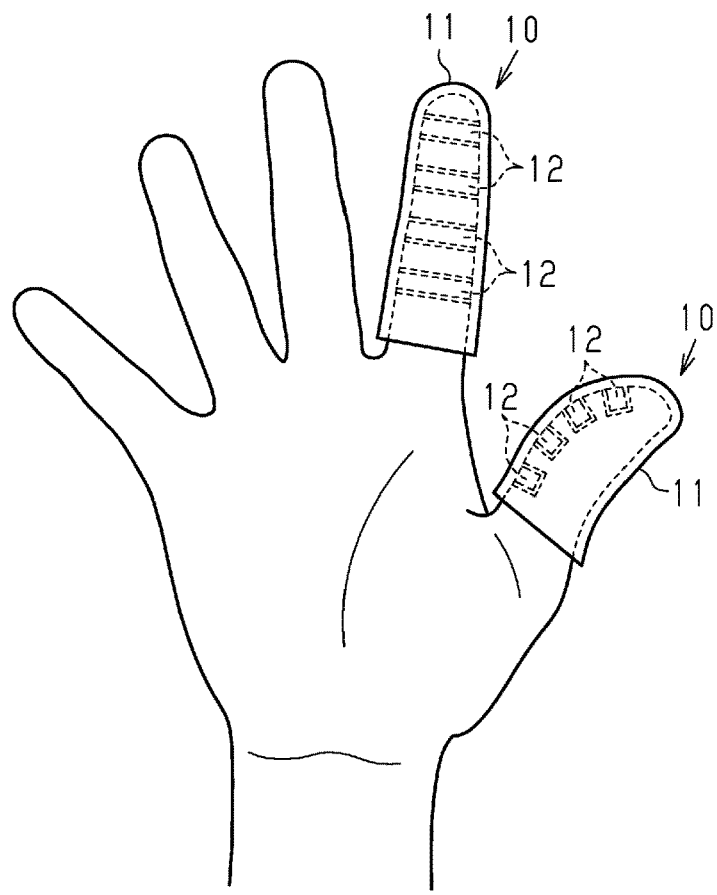
FIG. 1 is a front view of haptic feedback devices according to a first embodiment.

As shown in FIG. 1, the haptic feedback devices 10 each include a base 11 and dielectric elastomer actuators (hereinafter, referred to as DEAs) 12. The base 11 is configured to be attached to a finger of a user. The DEA 12 is a rectangular sheet placed on an inner surface of the base 11.

The base 11 is made of a flexible material that can be curved, and expand or contract in any planar direction. The flexible materials used for the base 11 include an elastomer such as silicone and urethane, and a stretch fabric. The base 11 includes an annular portion having an annular cross section. The DEAs 12 are placed on and fixed to the inner surface of the annular portion of the base 11.

Figure 2:
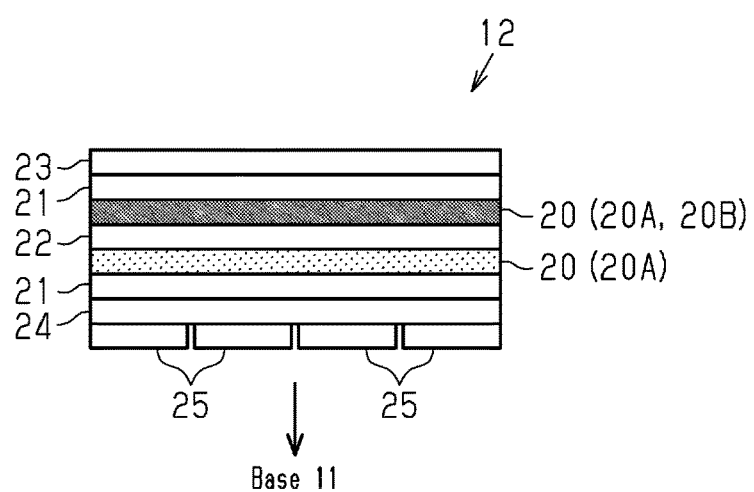
FIG. 2 is a side view illustrating a layer structure of a dielectric elastomer actuator of the first embodiment.
Figure 3:
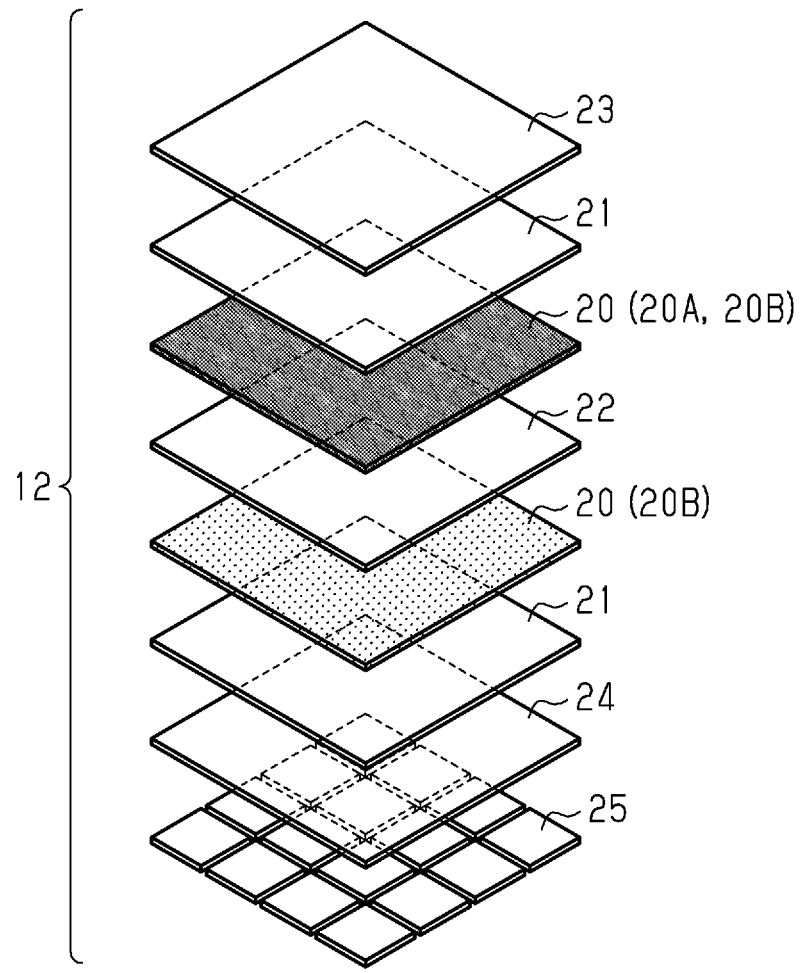
FIG. 3 is an exploded perspective view illustrating the layer structure of the dielectric elastomer actuator of the first embodiment.

As shown in FIGS. 2 and 3, each DEA 12 has a multilayer structure that includes stacked sets of a sheet-shaped dielectric layer 20, which is made of a dielectric elastomer, a first electrode layer 21, and a second electrode layer 22. In each set, a first electrode layer 21 and a second electrode layer 22 are arranged on the opposite sides in the thickness direction of the dielectric layer 20, so as to sandwich the dielectric layer 20. The first electrode layer 21 is a positive electrode, and the second electrode layer 22 is a grounding electrode.

In the present embodiment, from the side closer to the base 11, radiator plates 25, a second insulating layer 24, a first electrode layer 21, a dielectric layer 20 (an expansion-contraction portion 20A), a second electrode layer 22, a dielectric layer 20 (an expansion-contraction portion 20A, a heat generating portion 20B), a first electrode layer 21, and a first insulating layer 23 are stacked in that order.

The first insulating layer 23 and the second insulating layer 24 are both made of an insulating elastomer.

The first insulating layer 23 forms the outermost layer of the DEA 12 and functions as a transmitting layer of the present disclosure.

The dielectric elastomer forming the dielectric layers 20 is not particularly limited, and may be any dielectric elastomer that is typically used for DEAs. The dielectric elastomer may be, for example, crosslinked polyrotaxane, silicone elastomer, acrylic elastomer, or urethane elastomer. Further, one of these types of dielectric elastomer may be used alone, or two or more of these may be used in combination. The thickness of the dielectric layers 20 is, for example, 10 to 200 µm.

The materials for the first electrode layers 21 and the second electrode layer 22 include, for example, conductive elastomer, carbon nanotubes, Ketjen black (registered trademark), and vapor-deposited metal films. The conductive elastomer includes, for example, a conductive elastomer that contains an insulating polymer and a conductive filler.

The insulating polymer includes, for example, a crosslinked polyrotaxane, silicone elastomer, acrylic elastomer, or urethane elastomer. One of these types of insulating polymer may be used alone, or two or more of these may be used in combination. The conductive filler may be, for example, Ketjen black (registered trademark), carbon black, or metal particles of copper, silver, or the like. One of these types of conductive filler may be used alone, or two or more of these may be used in combination. The thicknesses of the first electrode layer 21 and the second electrode layer 22 are, for example, 0.1 to 100 µm.

The insulating elastomer forming the first insulating layer 23 and the second insulating layer 24 is not particularly limited, and may be a typical dielectric elastomer that is used for the insulating part of a typical DEA. The insulating elastomer may be, for example, crosslinked polyrotaxane, silicone elastomer, acrylic elastomer, or urethane elastomer. Further, one of these types of insulating elastomer may be used alone, or two or more of these may be used in combination. The thicknesses of the first insulating layer 23 and the second insulating layer 24 are, for example, 10 to 100 µm.

The radiator plates 25 are made of a material that has a higher thermal conductivity than that of the material of the second insulating layer 24. In the present embodiment, the radiator plates 25 are formed by sheets of metal, such as aluminum. The radiator plates 25, each having a square shape in a plan view, are arranged with a predetermined clearance with regard to one another in planar directions of a main surface of the second insulating layer 24.

Figure 4:
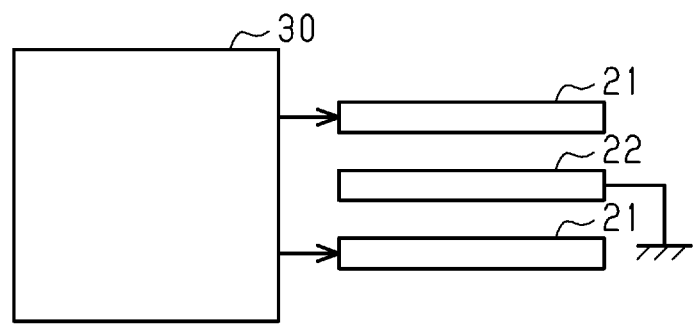
FIG. 4 is a block diagram showing an electrical configuration of the haptic feedback device according to the first embodiment.

As shown in FIG. 4, the haptic feedback device 10 includes a driving unit 30, which applies a voltage between the electrode layers 21 and 22, which sandwich the dielectric layer 20. The driving unit 30 may be circuitry including: 1) one or more processors that operate according to a computer program (software); 2) one or more dedicated hardware circuits (application specific integrated circuits: ASIC) that execute at least part of various processes, or 3) a combination thereof. The processor includes a CPU and memories such as a RAM and a ROM. The memories store program codes or commands configured to cause the CPU to execute processes. The memory, which is computer readable medium, includes any type of media that are accessible by general-purpose computers and dedicated computers. The electrode layers 21, 22 and the driving unit 30 are electrically connected to each other via wiring (not shown).

When a low-frequency alternating voltage (hereinafter, referred to as an expansion-contraction voltage) is applied between each first electrode layer 21 and the second electrode layer 22, the dielectric layers 20 vibrate by repeating expansion and contraction. That is, when the applied voltage is increased, the dielectric layers 20 are deformed to be compressed in the thickness direction and expand in directions along the surface of the dielectric layers 20 (planar directions of the DEA 12). Also, when the applied voltage is reduced, the dielectric layers 20 are deformed to expand in the thickness direction and contract in directions along the surface of the dielectric layers 20 (the planar directions of the DEA 12). Such expansion and contraction of the dielectric layers 20 are repeated, so that the dielectric layers 20 vibrate.

When an alternating voltage having a frequency higher than that of the expansion-contraction voltage (hereinafter, referred to as a heat generating voltage) is applied between each first electrode layer 21 and the second electrode layer 22, the dielectric layers 20 generate heat.

The frequency of the expansion-contraction voltage is lower than or equal to 1 kHz, and the frequency of the heat generating voltage is higher than 1 kHz. In the present embodiment, the frequency of the expansion-contraction voltage is 1 kHz, and the frequency of the heat generating voltage is 20 kHz. If the frequency of the heat generating voltage is higher than 20 kHz, the noise of vibration of the dielectric layers 20 due to application of the heat generating voltage is out of the hearing range of humans, thus causing no discomfort for the user.

The driving unit 30 applies the expansion-contraction voltage between each first electrode layer 21 and the second electrode layer 22.

In contrast, the driving unit 30 applies the heat generating voltage between the second electrode layer 22 and the first electrode layer 21 that is adjacent to the first insulating layer 23 in the stacking direction of the DEA 12 (the upper first electrode layer 21 as viewed in FIG. 2). The expansion-contraction voltage and the heat generating voltage may be 100 to 1500 V.

In the present embodiment, the dielectric layer 20 that is located between the second electrode layer 22 and the first electrode layer 21 adjacent to the first insulating layer 23 functions as an expansion-contraction portion 20A, which expands and contracts when applied with a voltage, and a heat generating portion 20B, which generates heat when applied with a voltage. That is, the heat generating portion 20B is formed by the same dielectric layer 20 that forms one of the expansion-contraction portions 20A.

Also, the dielectric layer 20 between the second electrode layer 22 and the first electrode layer 21 adjacent to the second insulating layer 24 (the lower first electrode layer 21 as viewed in FIG. 2) functions as an expansion-contraction portion 20A, which expands and contracts when applied with a voltage.

As shown in FIG. 1, the DEAs 12 are fixed to the inner surface of the annular portion of each base 11. Specifically, four DEAs 12 are arranged with a predetermined clearance with regard to one another in the axial direction of the annular portion.

An operation of the present embodiment will now be described.

As shown in FIG. 1, each haptic feedback device 10 enters an attached state when the bag-shaped base 11 is attached to a finger of the user, so that the DEAs 12, which are fixed to the inner surface of the base 11, contact the pulp of the finger.

In the attached state, when a low-frequency expansion-contraction voltage is applied between the electrode layers 21 and 22, which sandwich each dielectric layer 20 (each expansion-contraction portion 20A) through the driving unit 30, vibration is transmitted to the user via the first insulating layer 23, which functions as a transmitting portion.

When a heat generating voltage, which has a higher frequency than the expansion-contraction voltage, is applied between the electrode layers 21 and 22 that sandwich one of the dielectric layers 20 (the heat generating portion 20B), heat sensation is transmitted to the user via the first insulating layer 23.

Further, when the expansion-contraction voltage is applied to the expansion-contraction portion 20A, and the heat generating voltage is applied to the heat generating portions 20B, vibration and heat sensation are both transmitted to the user via the first insulating layer 23.

The base 11, on which the DEAs 12 are stacked, is flexible so as to expand and contract in the planar directions. Therefore, even though the DEAs 12 are stacked on and fixed to the base 11, the DEAs 12 are allowed to expand and contract together with the base 11, so as to be capable of transmitting the vibration to the finger.

The base 11 is flexible and thus can be curved. Therefore, when the user wears the haptic feedback device 10, the DEAs 12 and the base 11 are deformed in conformity with the surface shape of the finger, so that the DEAs 12 are brought into close contact with the finger in a broad area. Further, since the DEAs 12 and the base 11 are deformed to follow motion of the finger, even if the user moves the finger wearing the haptic feedback device 10, the DEAs 12 remain in close contact with the finger.

The present embodiment has the following advantages.

(1) The present embodiment operates in the above-described manner and is thus capable of transmitting both vibration and heat sensation to a user.

(2) In the stacking direction of the DEAs 12, the first electrode layer 21 to which the heat generating voltage is applied is adjacent to the first insulating layer 23, which functions as the transmitting portion.

With this configuration, the heat generating portion 20B is closest in the stacking direction to the first insulating layer 23, which functions as the transmitting portion. Therefore, the heat generated by the heat generating portion 20B is more effectively transmitted to the user via the first insulating layer 23.

(3) The heat generating portion 20B is formed by the same dielectric layer 20 that forms one of the expansion-contraction portions 20A. This simplifies the structure of each DEA 12.

(4) Each DEA 12 includes the radiator plates 25, which form the outermost layer on the opposite side from the first insulating layer 23, which functions as the transmitting portion. Therefore, the heat generated by the heat generating portion 20B and the electrode layers 21, 22 due to application of a voltage is effectively released to the outside via the radiator plates 25. This suppresses deterioration of the DEA 12 due to the heat remaining in the dielectric layers 20 and the electrode layers 21, 22.

(5) The radiator plates 25 are arranged with a predetermined clearance with regard to one another. The clearances between the radiator plates 25 allow the radiator plates 25 to be displaced relative to one another. The radiator plates 25 thus collectively follow deformation of the DEA 12. Also, the clearances allow heat to be further effectively released.

(6) Each haptic feedback device 10 includes the base 11, which supports the DEAs 12 and is configured to be attached to a finger of a user in a state in which the first insulating layer 23 serving as the transmitting portion is brought into contact with the finger. Thus, the first insulating layer 23 of each DEA 12 maintains contact with the finger of the user by attaching the base 11 to the finger.

Second Embodiment

A second embodiment will now be described with reference to FIGS. 5 and 6. Differences from the first embodiment will mainly be discussed. The same reference numerals are given to those components in the second embodiment that are the same as the corresponding components of the first embodiment, and redundant explanations are omitted.

Figure 5:
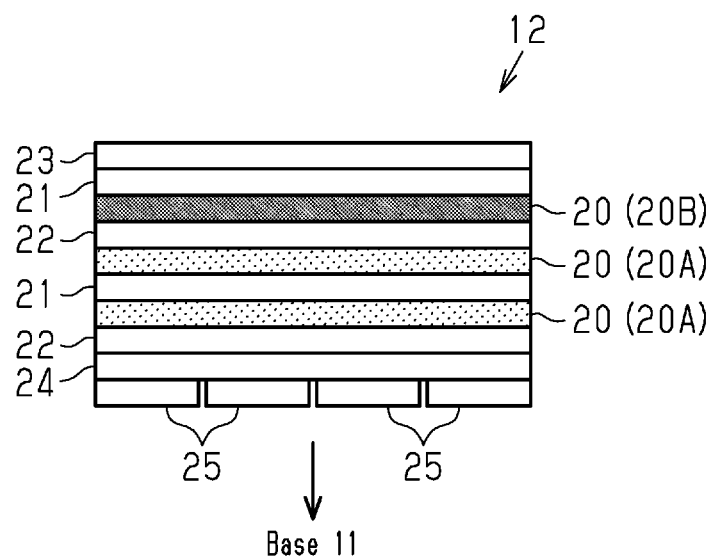
FIG. 5 is a side view illustrating a layer structure of a dielectric elastomer actuator according to a second embodiment.

In the present embodiment, from the side closer to a base 11 of a DEA 12, radiator plates 25, a second insulating layer 24, a second electrode layer 22, a dielectric layer 20 (an expansion-contraction portion 20A), a first electrode layer 21, a dielectric layer 20 (an expansion-contraction portion 20A), a second electrode layer 22, a dielectric layer 20 (a heat generating portion 20B), a first electrode layer 21, and a first insulating layer 23 are stacked in that order as shown in FIG. 5.

Figure 6:
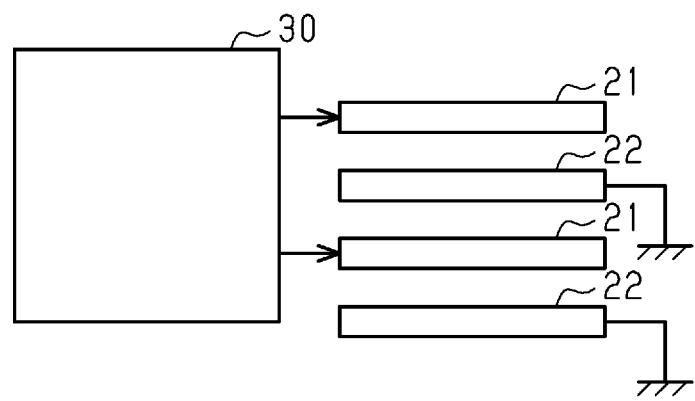
FIG. 6 is a block diagram showing an electrical configuration of the haptic feedback device according to the second embodiment.

As shown in FIG. 6, a driving unit 30 applies an expansion-contraction voltage between the second electrode layers 22 and the first electrode layer 21 that is closer to the base 11 in the stacking direction of the DEA 12 (the lower first electrode layers 21 as viewed in FIG. 5).

In contrast, the driving unit 30 applies the heat generating voltage between the upper one of the second electrode layers 22 and the first electrode layer 21 that is adjacent to the first insulating layer 23 in the stacking direction of the DEA 12 (the upper first electrode layer 21 as viewed in FIG. 5).

As shown in FIG. 5, the dielectric layer 20 between the upper one of the second electrode layers 22 and the first electrode layer 21 adjacent to the first insulating layer 23 functions as a heat generating portion 20B, which generates heat when applied with a voltage.

Also, two of the dielectric layers 20 are each located between one of the two second electrode layers 22 and the first electrode layer 21 that is not adjacent to the first insulating layer 23. These dielectric layers 20 function as the expansion-contraction portions 20A, which expand and contract when applied with a voltage.

That is, the heat generating portion 20B is formed by the dielectric layer 20 that is different from the expansion-contraction portions 20A. The heat generating portion 20B and the expansion-contraction portions 20A are stacked in the stacking direction of the DEA 12.

An operation of the present embodiment will now be described.

In the attached state of the haptic feedback device 10, when the low-frequency expansion-contraction voltage is applied between the electrode layers 21 and 22, which sandwich the dielectric layers 20 (each expansion-contraction portion 20A) through the driving unit 30, vibration is transmitted to the user via the first insulating layer 23, which functions as a transmitting portion.

When a heat generating voltage, which has a higher frequency than the expansion-contraction voltage, is applied between the electrode layers 21 and 22 that sandwich one of the dielectric layers 20 (the heat generating portion 20B), heat sensation is transmitted to the user via the first insulating layer 23.

Further, when the expansion-contraction voltage is applied to the expansion-contraction portions 20A, and the heat generating voltage is applied to the heat generating portion 20B, vibration and heat sensation are both transmitted to the user via the first insulating layer 23.

An operation of the present embodiment will now be described.

The haptic feedback device 10 according to the present embodiment has the following advantage in addition to the advantages (1), (2), and (4) to (6) of the first embodiment.

(7) In a case in which a heat generating portion 20B is formed by the same dielectric layer 20 that forms an expansion-contraction portion 20A, the dielectric layer 20 may deteriorate prematurely due to repetitive expansion and contraction, and heat generation.

In this regard, the heat generating portion 20B of the present embodiment is formed by a dielectric layer 20 different from those of the expansion-contraction portions 20A. This suppresses premature deterioration of the dielectric layer 20.

(8) The heat generating portion 20B and the expansion-contraction portions 20A are stacked in the stacking direction of the DEA 12. Thus, vibration and heat sensation are transmitted via the same region in the first insulating layer 23, which functions as the transmitting portion. The above-described configuration also allows the size of the DEA 12 to be reduced in the planar directions.

Third Embodiment

A third embodiment will now be described with reference to FIGS. 7 and 8. Differences from the first embodiment will mainly be discussed. The same reference numerals are given to those components in the third embodiment that are the same as the corresponding components of the first embodiment, and redundant explanations are omitted.

Figure 7:
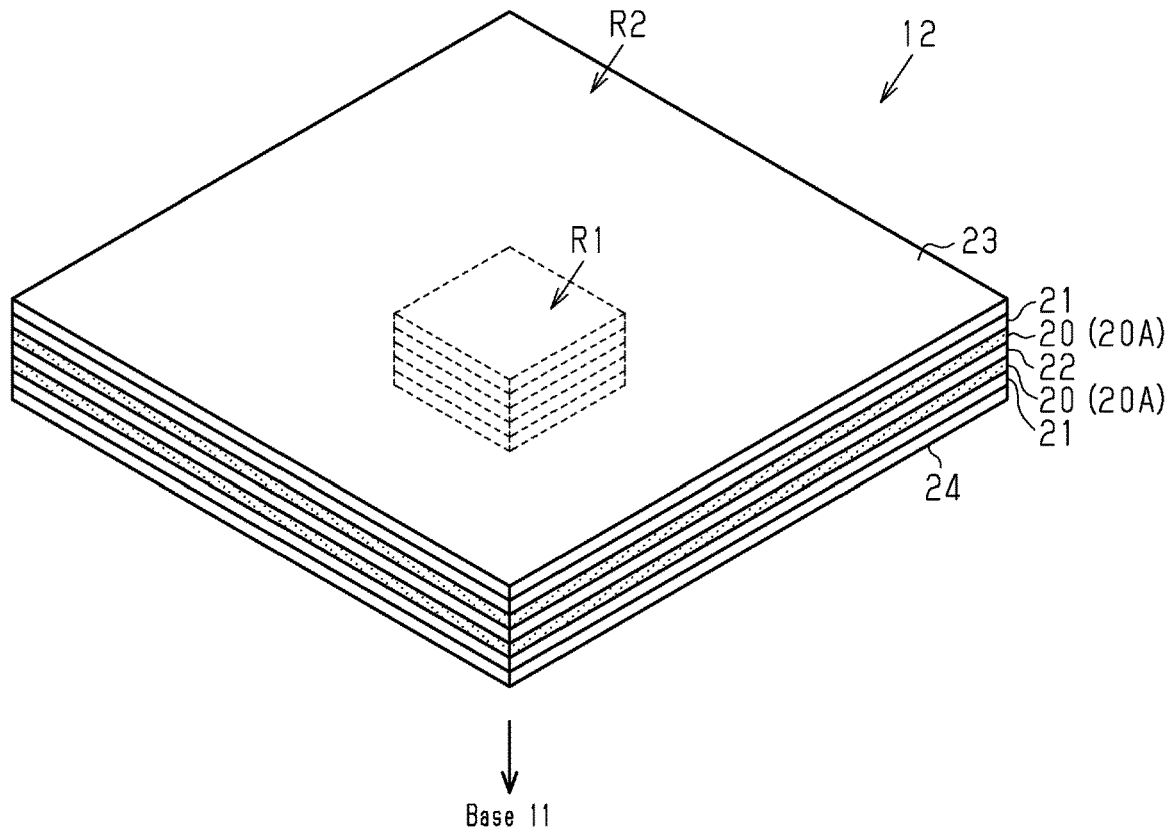
FIG. 7 is a perspective view illustrating a dielectric elastomer actuator according to a third embodiment.

As shown in FIG. 7, a DEA 12 of the present embodiment includes a first region R1 located at the center in the planar directions of the DEA 12, and a second region R2 on the outer side of and adjacent to the first region R1.

Figure 8:
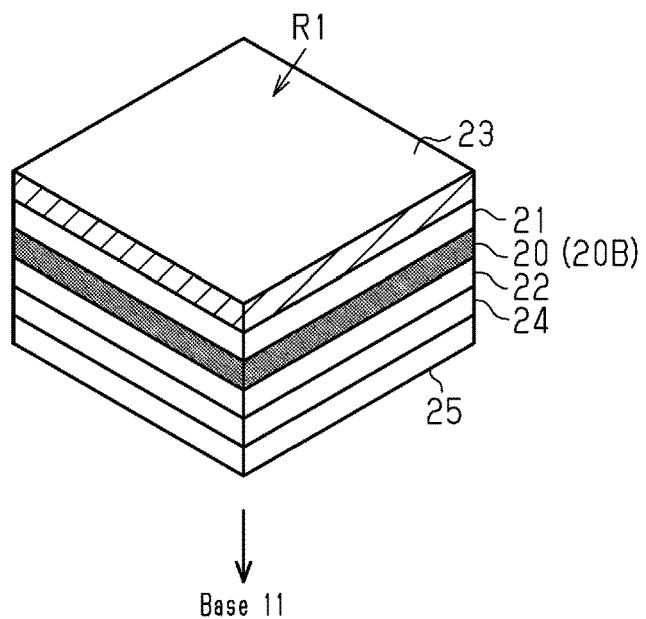
FIG. 8 is a perspective view illustrating a first region of the third embodiment.

In the first region R1, from the side closer to a base 11, a radiator plate 25, a second insulating layer 24, a second electrode layer 22, a dielectric layer 20 (a heat generating portion 20B), a first electrode layer 21, and a first insulating layer 23 are stacked in that order as shown in FIG. 8.

In the first region R1, the dielectric layer 20 between the first electrode layer 21 and the second electrode layer 22 functions as the heat generating portion 20B, which generates heat when applied with a voltage.

In the second region R2, from the side closer to the base 11, a second insulating layer 24, a first electrode layer 21, a dielectric layer 20 (an expansion-contraction portion 20A), a second electrode layer 22, a dielectric layer 20 (an expansion-contraction portion 20A), a first electrode layer 21, and a first insulating layer 23 are stacked in that order as shown in FIG. 7.

In the second region R2, the dielectric layer 20 between each first electrode layer 21 and the second electrode layer 22 functions as an expansion-contraction portion 20A, which expands and contracts when applied with a voltage.

That is, the heat generating portion 20B is formed by the dielectric layer 20 that is different from the expansion-contraction portions 20A. The heat generating portion 20B and the expansion-contraction portions 20A are arranged to be adjacent to each other in the planar directions of the DEA 12.

In the present embodiment, the area of the main surface of the heat generating portion 20B is smaller than the area of the main surface of each expansion-contraction portion 20A.

The first region R1 and the second region R2 share the first insulating layer 23. On the other hand, in the section other than the first insulating layer 23, the first region R1 and the second region R2 are formed separately and are electrically insulated from each other.

An operation of the present embodiment will now be described.

In the attached state of the haptic feedback device 10, when the low-frequency expansion-contraction voltage is applied between the electrode layers 21 and 22, which sandwich each dielectric layer 20 (each expansion-contraction portion 20A) in the second region R2 through the driving unit 30, vibration is transmitted to the user via the first insulating layer 23, which functions as a transmitting portion.

When a heat generating voltage, which has a higher frequency than the expansion-contraction voltage, is applied between the electrode layers 21 and 22 that sandwich the dielectric layer 20 (the heat generating portion 20B) in the first region R1, heat sensation is transmitted to the user via the first insulating layer 23.

Further, when the expansion-contraction voltage is applied to the expansion-contraction portions 20A, and the heat generating voltage is applied to the heat generating portion 20B, vibration and heat sensation are both transmitted to the user via the first insulating layer 23.

The present embodiment has the following advantages.

The haptic feedback device according to the present embodiment has the following advantage in addition to the advantages (1), (2), and (4) to (6) of the first embodiment.

(9) Since the heat generating portion 20B and the expansion-contraction portions 20A are adjacent to each other in the planar directions of the DEA 12, the region that transmits vibration to the finger of the user, and the region that transmits heat sensation to the finger are separated from each other in the first insulating layer 23 as the transmitting portion.

The above-described configuration also allows the size of the DEA 12 to be reduced in the stacking direction.

(10) The spatial resolution of a human when perceiving heat is lower than the spatial resolution when perceiving vibration.

In this regard, since the area of the main surface of the heat generating portion 20B is smaller than the area of the main surface of each expansion-contraction portion 20A, the present embodiment allows the size of the DEA 12 in the planar directions to be reduced, while effectively transmitting vibration and heat sensation.

<Modifications>

The above-described embodiments may be modified as follows. The above-described embodiments and the following modifications can be combined as long as the combined modifications remain technically consistent with each other.

The dielectric elastomer forming the dielectric layers 20 is not limited to polyrotaxane, but may be another dielectric elastomer such as silicone elastomer, acrylic elastomer, and/or urethane elastomer.

The insulating polymer in the conductive elastomer forming the electrode layers 21, 22 is not limited to polyrotaxane, but may be another insulating polymer such as silicone elastomer, acrylic elastomer, or urethane elastomer. Further, one of these types of insulating polymer may be used alone, or two or more of these may be used in combination.

The conductive filler in the conductive elastomer forming the electrode layers 21, 22 is not limited to Ketjen black, but may be other types of carbon black, carbon nanotubes, or metal particles of copper, silver or the like. Further, one of these types of conductive filler may be used alone, or two or more of these may be used in combination. Further, the conductive filler may form a layer by itself.

In the above-described embodiments, the frequency of the heat generating voltage is higher than that of the expansion-contraction voltage. However, the heat generating voltage may have a low frequency like the expansion-contraction voltage. In this case, the dielectric layer forming the heat generating portion may be made of a material that transmits heat more easily than the dielectric layer forming the expansion-contraction portion. Also, the dielectric layer forming the heat generating portion may be thicker than the dielectric layer forming the expansion-contraction portion. The thickness of the dielectric layer forming the heat generating portion may be larger than 200 µm. Such a configuration of the heat generating portion is capable of transmitting heat sensation to the user simply by being applied with a low-frequency heat generating voltage like the expansion-contraction voltage by the driving unit.

The haptic feedback devices 10 according to the present disclosure do not necessarily need to be attached to fingers, but may be attached to toes. Also, the haptic feedback devices 10 may be attached to other sections of a human body.

The first insulating layer 23 functioning as the transmitting portion may be provided with a pressure sensitive adhesive, so that the DEA 12 is attached to the body of a user via the pressure sensitive adhesive. In this case, the base 11 can be omitted.

Figure 9:
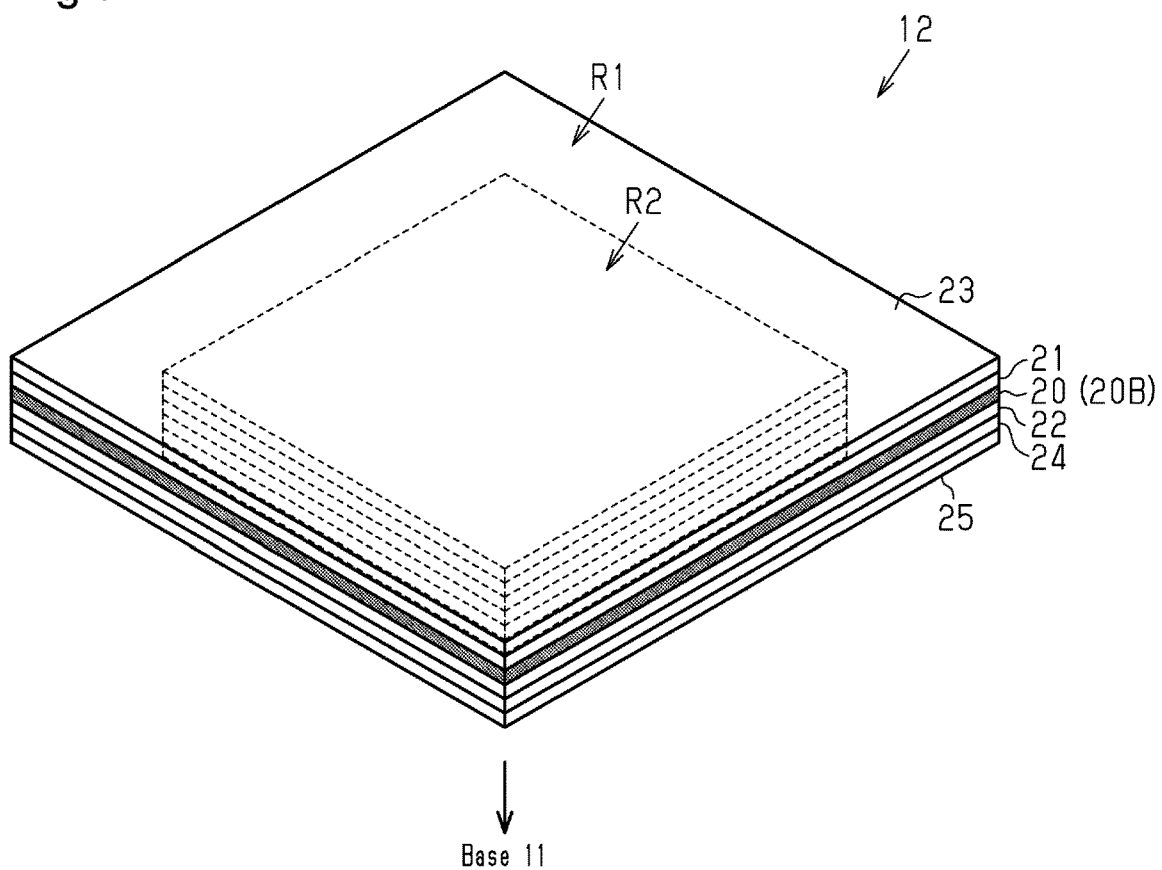
FIG. 9 is a perspective view illustrating a dielectric elastomer actuator according to a modification.
Figure 10:
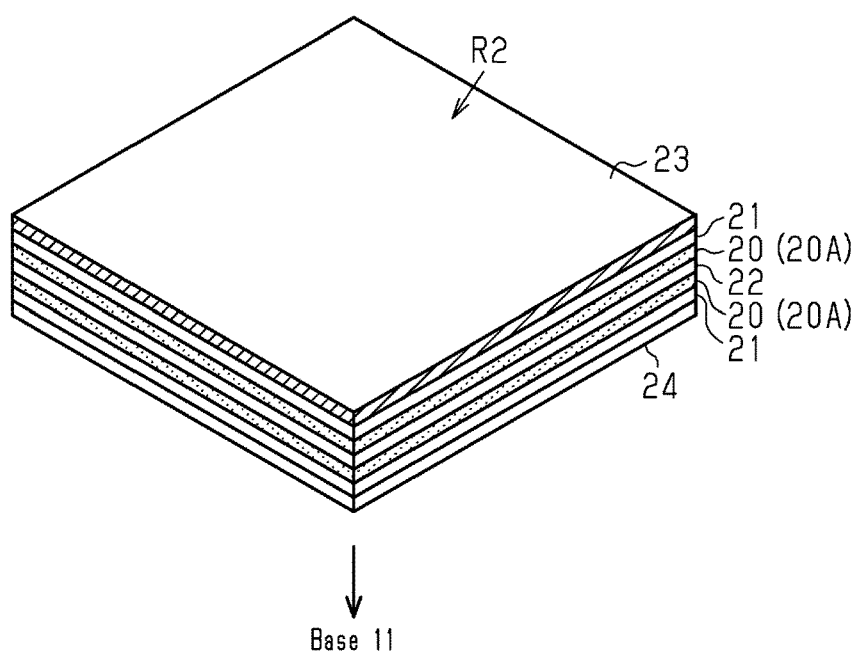
FIG. 10 is a perspective view illustrating a first region of the modification.

As shown in FIGS. 9 and 10, a second region R2 may be located at the center in the planar directions of a DEA 12, and a first region R1 may be located on the outer side of and adjacent to the second region R2. In this case also, the area of the main surface of the heat generating portion 20B simply needs to be smaller than the area of the main surface of each expansion-contraction portion 20A.

In the third embodiment and the modification described in FIGS. 9 and 10, the area of the main surface of the heat generating portion 20B may be larger than the area of the main surface of each expansion-contraction portion 20A.

The number and the shape of the radiator plates 25 may be changed. For example, in case of a soft radiator plate 25, only one radiator plate 25 may be placed on the main surface of the second insulating layer 24.

The radiator plates 25 may be omitted.

The heat generating portion 20B may be located between, in the stacking direction of the DEA 12, the electrode layers 21 (22) that are not adjacent to the transmitting layer (the first insulating layer 23).

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A haptic feedback device, comprising:
a dielectric elastomer actuator that includes
at least one dielectric layer,
electrode layers sandwiching the dielectric layer, and
a transmitting layer that is stacked on at least one of the electrode layers and forms an outermost layer; and
a driving unit configured to apply voltage between the electrode layers sandwiching the dielectric layer, wherein
the at least one dielectric layer includes
an expansion-contraction portion, which expands and contracts when applied with a voltage, and
a heat generating portion, which generates heat when applied with a voltage, and the haptic feedback device is configured to
transmit vibration to a user via the transmitting layer by applying an expansion-contraction voltage between the electrode layers sandwiching the expansion-contraction portion through the driving unit, and
transmit heat sensation to the user via the transmitting layer by applying a heat generating voltage between the electrode layers sandwiching the heat generating portion through the driving unit, wherein
the heat generating voltage has a higher frequency than that of the expansion-contraction voltage.

2. The haptic feedback device according to claim 1, wherein one of the electrode layers to which the heat generating voltage is applied is adjacent to the transmitting layer in a stacking direction of the dielectric elastomer actuator.

3. The haptic feedback device according to claim 1, wherein the heat generating portion is formed by a same dielectric layer that forms the expansion-contraction portion.

4. The haptic feedback device according to claim 1, wherein the heat generating portion is formed by a dielectric layer different from a dielectric layer that forms the expansion-contraction portion.

5. The haptic feedback device according to claim 4, wherein the heat generating portion and the expansion-contraction portion are stacked together in a stacking direction of the dielectric elastomer actuator.

6. The haptic feedback device according to claim 4, wherein the heat generating portion and the expansion-contraction portion are adjacent to each other in a planar direction of the dielectric elastomer actuator.

7. The haptic feedback device according to claim 6, wherein an area of a main surface of the heat generating portion is smaller than an area of a main surface of the expansion-contraction portion.

8. The haptic feedback device according to claim 1, wherein the dielectric elastomer actuator includes a radiator plate that forms an outermost layer on an opposite side from the transmitting portion.

9. The haptic feedback device according to claim 8, wherein
the radiator plate includes multiple radiator plates, and
the radiator plates are arranged with a predetermined clearance with regard to one another.

10. The haptic feedback device according to claim 1, further comprising a base that supports the dielectric elastomer actuator and is configured to be attached to a body of the user such that the transmitting layer is in contact with the body.

11. A haptic feedback device, comprising:
a dielectric elastomer actuator that includes
at least one dielectric layer,
electrode layers sandwiching the dielectric layer, and
a transmitting layer that is stacked on at least one of the electrode layers and forms an outermost layer; and
a driving unit configured to apply voltage between the electrode layers sandwiching the dielectric layer, wherein
the at least one dielectric layer includes
an expansion-contraction portion, which expands and contracts when applied with a voltage, and
a heat generating portion, which generates heat when applied with a voltage, and the haptic feedback device is configured to
transmit vibration to a user via the transmitting layer by applying an expansion-contraction voltage between the electrode layers sandwiching the expansion-contraction portion through the driving unit, and
transmit heat sensation to the user via the transmitting layer by applying a heat generating voltage between the electrode layers sandwiching the heat generating portion through the driving unit, wherein
the heat generating portion is formed by a dielectric layer different from a dielectric layer that forms the expansion-contraction portion.

12. The haptic feedback device according to claim 11, wherein one of the electrode layers to which the heat generating voltage is applied is adjacent to the transmitting layer in a stacking direction of the dielectric elastomer actuator.

13. The haptic feedback device according to claim 11, wherein the heat generating portion and the expansion-contraction portion are stacked together in a stacking direction of the dielectric elastomer actuator.

14. The haptic feedback device according to claim 11, wherein the heat generating portion and the expansion-contraction portion are adjacent to each other in a planar direction of the dielectric elastomer actuator.

15. The haptic feedback device according to claim 14, wherein an area of a main surface of the heat generating portion is smaller than an area of a main surface of the expansion-contraction portion.

16. The haptic feedback device according to claim 11, wherein the dielectric elastomer actuator includes a radiator plate that forms an outermost layer on an opposite side from the transmitting portion.

17. The haptic feedback device according to claim 16, wherein
the radiator plate includes multiple radiator plates, and
the radiator plates are arranged with a predetermined clearance with regard to one another.

18. The haptic feedback device according to claim 11, further comprising a base that supports the dielectric elastomer actuator and is configured to be attached to a body of the user such that the transmitting layer is in contact with the body.

* * * * *